(12) United States Patent
Yoshimura et al.

(10) Patent No.: US 11,460,214 B2
(45) Date of Patent: Oct. 4, 2022

(54) DUCT DEVICE

(71) Applicant: TOYODA GOSEI CO., LTD., Kiyosu (JP)

(72) Inventors: Mitsuhiro Yoshimura, Kiyosu (JP); Tomohiro Hirano, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 360 days.

(21) Appl. No.: 16/502,452

(22) Filed: Jul. 3, 2019

(65) Prior Publication Data
US 2020/0103136 A1   Apr. 2, 2020

(30) Foreign Application Priority Data

Sep. 28, 2018  (JP) .............................. JP2018-184343

(51) Int. Cl.
*F24F 13/02* (2006.01)
(52) U.S. Cl.
CPC ...... *F24F 13/0245* (2013.01); *F24F 13/0209* (2013.01)
(58) Field of Classification Search
CPC ..... F24F 13/0245; F24F 13/0209; F16B 5/07; B60H 1/00564
USPC ........................................................ 454/330
See application file for complete search history.

(56) References Cited

U.S. PATENT DOCUMENTS 5,531,345 A * 7/1996 Nakamura ............. H02G 3/088
                                                                 220/3.8
5,962,814 A * 10/1999 Skipworth .......... B60R 16/0215
                                                                 174/135
6,213,077 B1   4/2001 Horii
9,676,297 B2 * 6/2017 Peniche ............... B60N 2/0725
9,809,084 B2 * 11/2017 Grieb ................. B60H 1/00528

FOREIGN PATENT DOCUMENTS

| CN | 202991292 U | 6/2013 |
|---|---|---|
| JP | 2000-104635 A | 4/2000 |
| JP | 2002067974 A | 3/2002 |

(Continued)

OTHER PUBLICATIONS

Yoshida et al., JP2013-113091A English machine translation, Jun. 10, 2013 (Year: 2013).*

(Continued)

*Primary Examiner* — Steven S Anderson, II
*Assistant Examiner* — Phillip Decker
(74) *Attorney, Agent, or Firm* — Posz Law Group, PLC

(57) ABSTRACT

In a duct device that includes a duct body 9 having: an air flow path 90 defined thereinside; and a first divisional body 1 and a second divisional body 5 combined in a combining direction in which the first and second divisional bodies 1 and 5 approach each other, at time of positioning when a first duct portion 2 and a second duct portion 6 oppose each other, and an engagement portion 33 and an engagement projection 7 do not engage with each other, an outer wall portion 65 covers, from an outer side, a tip portion 21 that is a front end of the first duct portion 2, and the engagement portion 33 contacts with the engagement projection 7 in the combining direction, and covers a second engagement surface 72 that is a rear end of the engagement projection 7, with an engagement wrap portion 35, from the outer side.

14 Claims, 11 Drawing Sheets

(56) References Cited

FOREIGN PATENT DOCUMENTS

| JP | 2011099360 A | | 5/2011 |
|---|---|---|---|
| JP | 2013-087680 A | | 5/2013 |
| JP | 2013113089 A | * | 6/2013 |
| JP | 2013113091 A | * | 6/2013 |

OTHER PUBLICATIONS

Office Action dated May 21, 2021, issued in corresponding CN Patent Application No. 201910865525.4 (and English Machine Translation).

Office Action dated Aug. 31, 2021, issued in corresponding JP Patent Application No. 2018-184343 (and English Machine Translation).

\* cited by examiner

DUCT DEVICE

TECHNICAL FIELD

The present invention relates to a duct device such as an on-vehicle intake duct having a duct body in which an air flow path is defined.

BACKGROUND ART

A duct device typified by an on-vehicle intake duct has a duct body in which an air flow path is defined.

As this type of duct device, an integrated divisional duct device in which two or more divisional bodies formed by molding are combined and integrated with each other, is known.

In the integrated divisional duct device, the divisional bodies have engagement elements, respectively, and the engagement elements are engaged with each other in general.

For example, JP201387680 (A) discloses a technique in which an air duct is formed by two divisional bodies that are a first half and a second half. In the example in JP201387680 (A), the first half and the second half have engagement claws 32, 34 and engagement holes 36A, 38A, and the engagement claws are engaged with and locked in the engagement holes, whereby the first half and the second half are combined with each other, to produce an integral air duct.

In the operation for combining and integrating the two divisional bodies with each other, process steps of positioning one of the divisional bodies relative to the other of the divisional bodies, and engaging the engagement elements with each other, are necessary. The duct device often has a complicated three-dimensional shape. The operation for stably positioning the two divisional bodies and engaging the divisional bodies with each other is very complicated. Thus, a duct device that allows the positioning and engaging operation to be facilitated is required.

SUMMARY OF INVENTION

Technical Problem

The present invention is made in view of such circumstances, and an object of the present invention is to provide a duct device that allows an operation for positioning two divisional bodies and engaging the divisional bodies with each other to be facilitated.

Solution to Problem

In order to solve the aforementioned problem, a duct device of the present invention includes a duct body in which an air flow path is defined, and a first divisional body and a second divisional body are combined in a combining direction in which the first divisional body and the second divisional body approach each other. The first divisional body includes a first duct portion that is a part of the duct body, and an engagement piece having a leg portion and an engagement portion, the leg portion being integrated with the first duct portion and extending in the combining direction on an outer side of the first duct portion, the engagement portion being disposed at a front end of the leg portion. The second divisional body includes a second duct portion that is another part of the duct body, an outer wall portion, and an engagement projection, the outer wall portion being integrated with the second duct portion and extending in the combining direction on an outer side of the second duct portion, the engagement projection projecting outward from the outer wall portion and engaging with the engagement portion at a time of combination of the first divisional body and the second divisional body with each other. At a time of positioning in which the first duct portion and the second duct portion oppose each other, and in which the engagement portion and the engagement projection do not engage with each other, the engagement portion and the engagement projection contact with each other in the combining direction, the outer wall portion covers, from an outer side, a tip portion that is a front end of the first duct portion, and the engagement portion covers a second engagement surface that is a rear end of the engagement projection, with an engagement wrap portion, from the outer side.

Advantageous Effects of Invention

The duct device of the present invention allows an operation for positioning two divisional bodies and engaging the divisional bodies with each other to be facilitated.

DESCRIPTION OF EMBODIMENTS

Figure 1:
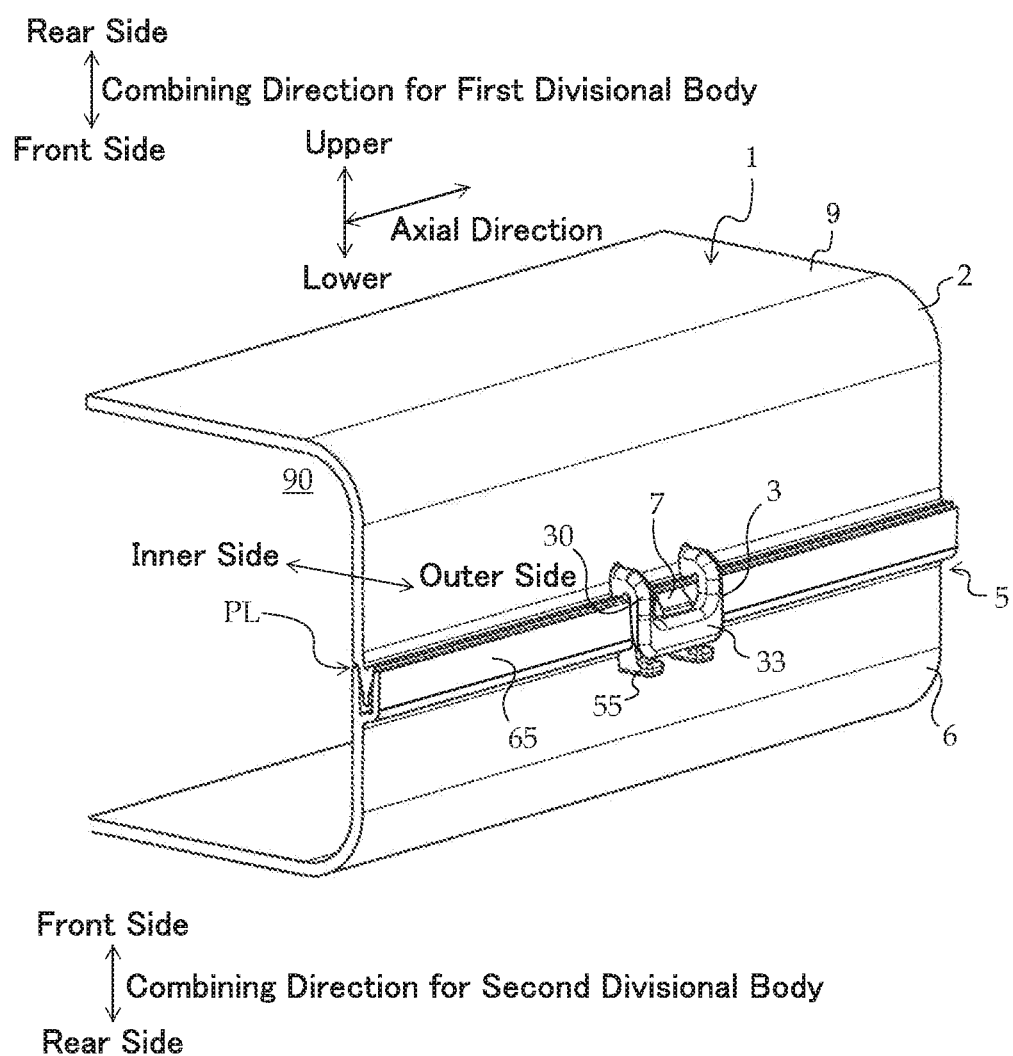
FIG. 1 is a perspective view schematically illustrating a main portion of a duct device of example 1 at a time of combination.

A duct device of the present invention has a first divisional body and a second divisional body combined with each other. In the present invention, as long as the duct device has the first divisional body and the second divisional body to be combined with each other, the duct device may merely include the first divisional body and the second divisional body, the duct device may include a member such as a sound absorber or a seal material in addition to the first divisional body and the second divisional body, or the duct device may include three or more divisional bodies.

In any case, the duct device of the present invention has a duct body in which an air flow path is defined, and the first divisional body and the second divisional body at least satisfy the following requirements.

The first divisional body and the second divisional body are combined with each other in a combining direction in which the first divisional body and the second divisional body approach each other, and constitute a part or the entirety of the duct device of the present invention.

The combining direction represents a direction toward the second divisional body for the first divisional body and a direction toward the first divisional body for the second divisional body. Therefore, the front side and the rear side of the first divisional body in the combining direction refer to the front side and the rear side in the direction toward the second divisional body. Meanwhile, the front side and the rear side of the second divisional body in the combining direction refer to the front side and the rear side in the direction toward the first divisional body.

Therefore, when the first divisional body and the second divisional body are combined with each other, that is, at a time of combination of the first divisional body and the second divisional body with each other, the combining direction for the first divisional body and the combining direction for the second divisional body are opposite to each other. Hereinafter, "when the first divisional body and the second divisional body are combined with each other" is simply referred to as "at a time of combination", as appropriate.

In the description herein, unless otherwise specified, the front side of each component in the first divisional body refers to the front side in the combining direction for the first divisional body, and the rear side of each component in the first divisional body refers to the rear side in the combining direction for the first divisional body. Similarly, the front end and the rear end of each component in the first divisional body refer to the front side end and the rear side end in the combining direction for the first divisional body.

Similarly, unless otherwise specified, the front side of each component in the second divisional body refers to the front side in the combining direction for the second divisional body, and the rear side of each component in the second divisional body refers to the rear side in the combining direction for the second divisional body. Similarly, the front end and the rear end of each component in the second divisional body refer to the front side end and the rear side end in the combining direction for the second divisional body.

Furthermore, in the description herein, unless otherwise specified, the inner side and the outer side represent the inner side and the outer side in the case of the air flow path of the duct body being regarded as the inner side. For example, a first duct portion and a second duct portion described below are positioned on the outer side of the air flow path.

The first divisional body has a first duct portion and an engagement piece. Among the first duct portion and the engagement piece, the first duct portion is a part of the duct body and defines a part of the air flow path described above. The engagement piece, more specifically, an engagement portion of the engagement piece engages with an engagement projection of the second divisional body described below at a time of combination.

The second divisional body has a second duct portion and an engagement projection. Among the second duct portion and the engagement projection, the second duct portion is another part of the duct body, and defines another part of the air flow path. The engagement projection engages with the engagement portion at a time of combination.

The second divisional body further includes an outer wall portion.

The outer wall portion is integrated with the second duct portion, and extends in the combining direction for the second divisional body on the outer side of the second duct portion. It is also considered that the outer wall portion is a proximal portion of the engagement projection.

In an operation for combining the first divisional body and the second divisional body with each other in the duct device of the present invention, when the first divisional body and the second divisional body are positioned relative to each other, the first duct portion of the first divisional body and the second duct portion of the second divisional body oppose each other, and the engagement portion of the first divisional body does not engage with the engagement projection of the second divisional body.

At the time of positioning, the engagement portion of the first divisional body and the engagement projection of the second divisional body contact with each other in the combining directions. Therefore, at this time, the first divisional body and the second divisional body are positioned relative to each other in the combining directions, respectively, that is, in the approaching directions in which the first divisional body and the second divisional body approach each other.

Furthermore, at this time, the outer wall portion of the second divisional body covers, from the outer side, the tip portion that is the front end of the first duct portion of the first divisional body. Moreover, the engagement portion of the first divisional body covers a second engagement surface that is the rear end of the engagement projection of the second divisional body, from the outer side, with an engagement wrap portion that is a part of the engagement portion.

Since the engagement projection is integrated with the outer side of the outer wall portion, the tip portion of the first duct portion (the first divisional body), the outer wall portion (the second divisional body), the second engagement surface of the engagement projection (the second divisional body), and the engagement wrap portion of the engagement portion (the first divisional body) are arranged in order, respectively, and cover each other or are covered by each other in the inner-outer direction of the duct device, at the time of positioning.

In other words, the front end portion of the first duct portion, the outer wall portion, the second engagement surface, and the engagement wrap portion overlap each other in a layered state in the inner-outer direction of the duct device.

Thus, by the portions of the first divisional body and the second divisional body overlapping each other in a layered state in the inner-outer direction of the duct device, the first divisional body and the second divisional body are positioned relative to each other in the inner-outer direction of the duct device at a time of positioning. As described above, the first divisional body and the second divisional body are positioned relative to each other also in the combining directions, respectively, by the engagement portion of the first divisional body and the engagement projection of the second divisional body. Therefore, the duct device of the present invention allows the first divisional body and the second divisional body to be stably positioned relative to each other, and eventually allows an operation for engaging the first divisional body and the second divisional body with each other to be facilitated.

A material of the duct device of the present invention is not particularly limited. However, in view of the first divisional body and the second divisional body being combined and integrated with each other, it is advantageous that the material of the first divisional body and the second divisional body is resin or metal since it is considered that resin or metal is appropriately molded and formed.

The duct device of the present invention has a duct body in which an air flow path is defined, and is preferably implemented as, for example, an on-vehicle intake duct or an air conditioning duct. In addition thereto, the air flow path of the duct device of the present invention is also used as a propagation path for propagating an object other than air. For example, the duct device of the present invention is also used as a resonator-type sound absorbing device.

Hereinafter, the duct device of the present invention is described by using specific examples.

Example 1

A duct device of example 1 is an on-vehicle intake duct made of resin.

Figure 2:
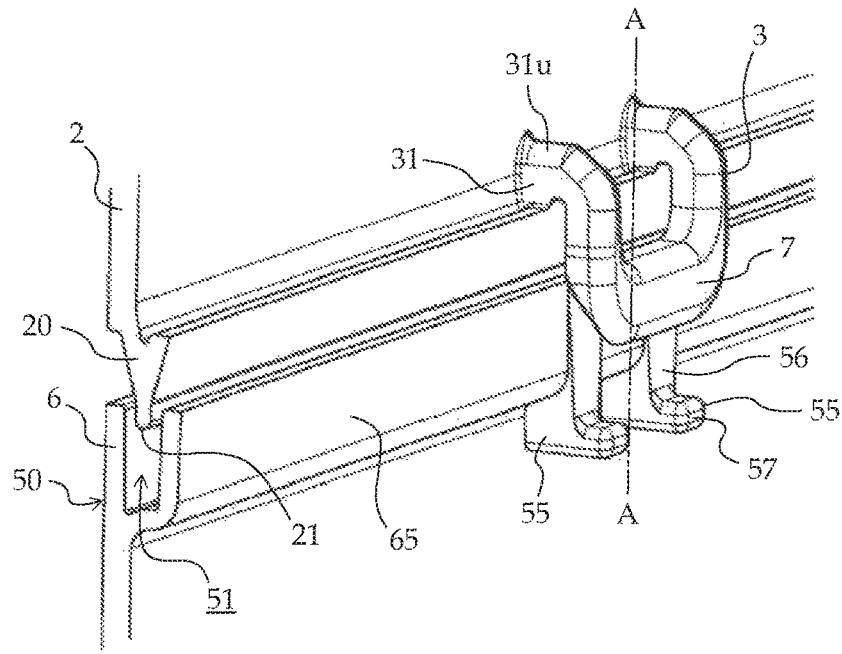
FIG. 2 is a perspective view schematically illustrating the main portion of the duct device of example 1 at a time of positioning.
Figure 3:
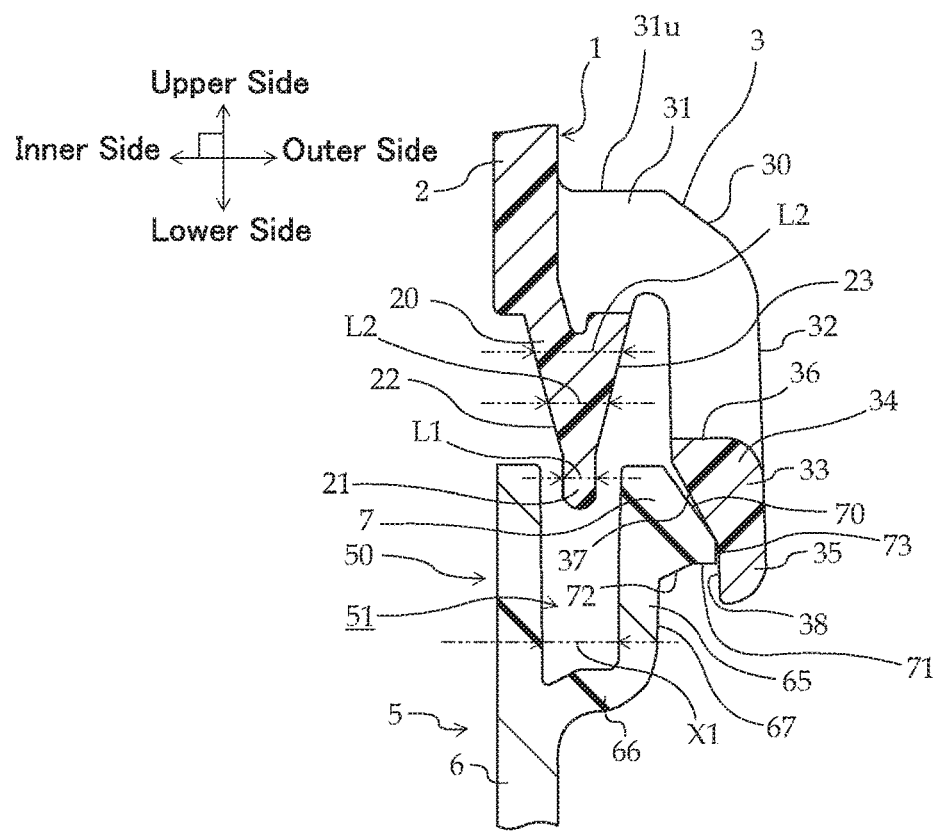
FIG. 3 is a cross-sectional view schematically illustrating a state where the duct device of example 1 is cut at positions A-A in FIG. 2.
Figure 4:
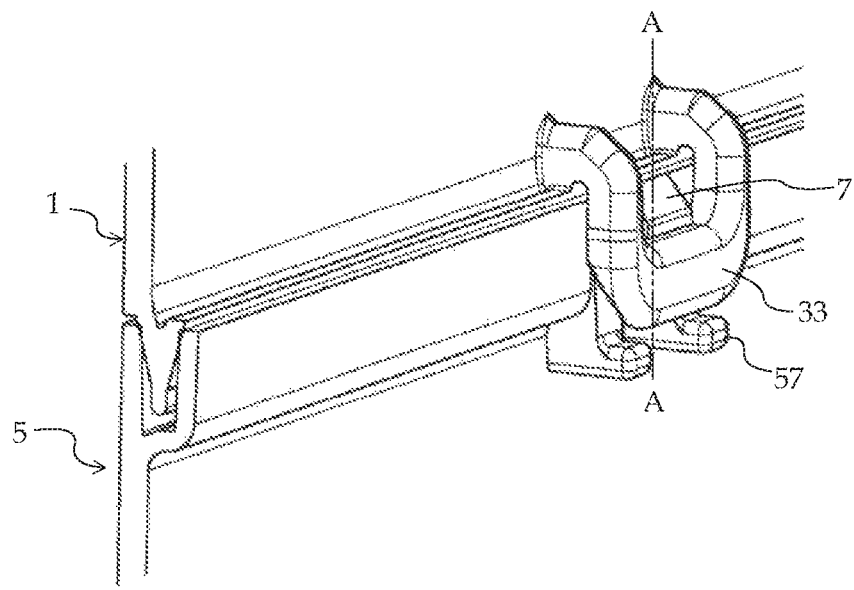
FIG. 4 is a perspective view schematically illustrating the main portion of the duct device of example 1 at the time of combination.
Figure 5:
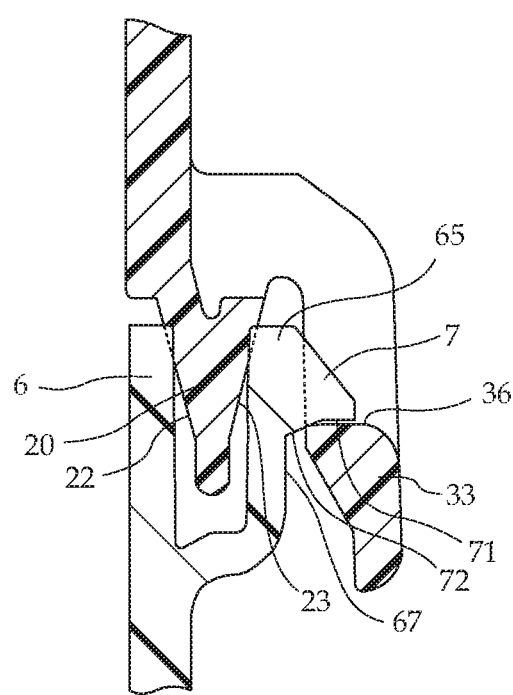
FIG. 5 is a cross-sectional view schematically illustrating a state where the duct device of example 1 is cut at positions A-A in FIG. 4.

FIG. 1 is a perspective view schematically illustrating a main portion of a duct device of example 1 at a time of combination. FIG. 2 is a perspective view schematically illustrating the main portion of the duct device of example 1 at a time of positioning. FIG. 3 is a cross-sectional view schematically illustrating a state where the duct device of example 1 is cut at positions A-A in FIG. 2. FIG. 4 is a perspective view schematically illustrating the main portion of the duct device of example 1 at the time of combination. FIG. 5 is a cross-sectional view schematically illustrating a state where the duct device of example 1 is cut at positions A-A in FIG. 4.

In each of examples described below, the outer side, the inner side, upper, lower, the axial direction, the combining direction for the first divisional body and the front side and the rear side in the combining direction, and the combining direction for the second divisional body and the front side and the rear side in the combining direction represent the directions, respectively, shown in FIG. 1. In examples described below, the front side in the combining direction for the first divisional body is the lower side in FIG. 1, and the rear side in the combining direction for the first divisional body is the upper side in FIG. 1. The front side in the combining direction for the second divisional body is the upper side in FIG. 1, and the rear side in the combining direction for the second divisional body is the lower side in FIG. 1.

As shown in FIG. 1, the duct device of example 1 includes a first divisional body 1 and a second divisional body 5.

The first divisional body 1 has a first duct portion 2 and an engagement piece 3. The first duct portion 2 has a half-divided tubular shape formed by a tubular duct body 9 being divided into two portions along the axial direction, that is, along the air flowing direction. The axial direction is, in other words, a direction in which a dividing line PL of the duct body 9 extends.

As shown in FIG. 2, a seal portion 20 that is a lower side portion of the first duct portion 2 is shaped so as to have a pointed end.

Specifically, as shown in FIG. 3, the seal portion 20 has two tilted surfaces that are tilted toward a tip portion 21 that is the lower end. An inner tilted surface 22 that is one of the tilted surfaces is tilted from the upper side and the inner side toward the lower side and the outer side, and extends in the axial direction. An outer tilted surface 23 that is the other of the tilted surfaces is tilted from the upper side and the outer side toward the lower side and the inner side, and extends in the axial direction.

In the seal portion 20, a portion below the inner tilted surface 22 and the outer tilted surface 23 extends in the up-down direction so as to be erected. The lower end of this portion is the tip portion 21. As shown in FIG. 3, a width L1 of the tip portion 21 in the inner-outer direction is less than a width X1 of a rail groove 51 described below. In a part of the seal portion 20 in the up-down direction, a width L2 between the tilted surfaces of the seal portion 20 in the inner-outer direction is greater than the width X1 of the rail groove 51.

As shown in FIG. 1, the engagement piece 3 has two leg portions 30 and an engagement portion 33. The two leg portions 30 are connected by the engagement portion 33 to form an almost U-shape. The leg portions 30 are spaced from each other in the axial direction. As shown in FIG. 2 and FIG. 3, each leg portion 30 has a leg proximal portion 31 that extends outward from the outer side surface of the first duct portion 2, and a leg body portion 32 that extends downward from the outer side end portion of the leg proximal portion 31.

The leg proximal portion 31, that is, an upper surface 31u in a portion of the leg portion 30 on the first duct portion 2 side is shaped so as to have a flat surface orthogonal to the up-down direction.

As shown in FIG. 3, the engagement portion 33 is extended on and between the lower end portions of the leg body portions 32 of the two leg portions 30. The engagement portion 33 has an engagement guide portion 34 that is an upper side portion, that is, a portion on the leg body portion 32 side, and an engagement wrap portion 35 that is a lower side portion. The engagement guide portion 34 has a first engagement surface 36 that is an upper surface, and a guide surface 37 that is tilted from the upper side and the inner side toward the lower side and the outer side. The engagement wrap portion 35 has a wrap surface 38 that extends along the axial direction and almost the up-down direction so as to be erected. For reference, the wrap surface 38 may be tilted.

The lower end of the engagement portion 33 is located at a position lower than the tip portion 21.

As shown in FIG. 1 and FIG. 2, the second divisional body 5 has a second duct portion 6, an outer wall portion 65, an engagement projection 7, and two regulation portions 55.

The second duct portion 6 has a half-divided tubular shape formed by the tubular duct body 9 being divided into two portions along the axial direction. In the duct device of example 1, the tubular duct body 9 includes the first duct portion 2 and the second duct portion 6 that oppose each other in the combining directions.

As shown in FIG. 3, the outer wall portion 65 has a wall proximal portion 66 that extends outward from the outer side surface of the second duct portion 6, and a wall body portion 67 that extends upward from the outer side end portion of the wall proximal portion 66. In the duct device of example 1, the upper end of the second duct portion 6 and the upper end of the wall body portion 67 are at almost the same position in the up-down direction.

In the duct device of example 1, the upper end portion of the second duct portion 6 and the outer wall portion 65 are disposed with a gap in the inner-outer direction to form a rail portion 50. The gap between the upper end portion of the second duct portion 6 and the outer wall portion 65 is referred to as a rail groove 51.

The engagement projection 7 projects outward from the outer side surface of the outer wall portion 65. The engagement projection 7 has: an engagement tilted surface 70 that is tilted from the inner side and the upper side toward the outer side and the lower side, and extends in the axial direction; an engagement erected surface 73 that extends at the lower end of the engagement tilted surface 70 in the up-down direction; an engagement end 71 that has a flat-surface shape and extends on the lower side of the engagement erected surface 73 in the inner-outer direction and the axial direction; and a second engagement surface 72 that is tilted from the outer side and the upper side toward the inner side and the lower side in a portion inward of the engagement end 71 and extends in the axial direction.

As shown in FIG. 1 and FIG. 2, the two regulation portions 55 are disposed on both sides, respectively, of the engagement projection 7 in the axial direction. As shown in FIG. 2, the regulation portions 55 each have an almost L-shape having a regulation leg portion 56 that is integrated with the outer side surface of the outer wall portion 65 and extends downward of the outer wall portion 65, and a regulation body portion 57 that projects outward from the lower end of the regulation leg portion 56.

A procedure for combining the first divisional body 1 and the second divisional body 5 with each other in the duct device of example 1 is described below.

Firstly, the second divisional body 5 is positioned so as to be stationary on the lower side such that the upper end of the second duct portion 6 and the upper end of the outer wall portion 65 face upward. Next, the first divisional body 1 is moved from the upper side toward the lower side while the first divisional body 1 is caused to oppose the second divisional body 5 such that the tip portion 21 of the first duct portion 2 and the lower end of the engagement piece 3 face downward. At this time, through visual checking by an operator, the engagement portion 33 of the first divisional body 1 and the engagement projection 7 of the second divisional body 5 are caused to oppose each other in the up-down direction. At this time, even if a relative position between the first divisional body 1 and the second divisional body 5 slightly deviates in the inner-outer direction, the engagement tilted surface 70 of the engagement projection 7 and the guide surface 37 of the engagement portion 33 guide each other since the engagement tilted surface 70 and the guide surface 37 are tilted, whereby the relative position between the first divisional body 1 and the second divisional body 5 is corrected. That is, the engagement tilted surface 70 and the guide surface 37 function as positioning guide surfaces.

When the first divisional body 1 has reached the position shown in FIG. 2 and FIG. 3, the first divisional body 1 is prevented from being moved downward. That is, at this time, the first divisional body 1 and the second divisional body 5 are positioned relative to each other.

At a time of positioning shown in FIG. 2 and FIG. 3, the first duct portion 2 and the second duct portion 6 oppose each other. At this time, the engagement portion 33 of the first divisional body 1 and the engagement projection 7 of the second divisional body 5 contact with each other in the up-down direction. Specifically, the guide surface 37 of the engagement portion 33 comes into contact with the engagement tilted surface 70 of the engagement projection 7 from the upper side. Therefore, downward movement of the engagement portion 33 is prevented, and downward movement of the first divisional body 1 having the engagement portion 33 is also prevented. Therefore, the first divisional body 1 and the second divisional body 5 are stably positioned relative to each other in the up-down direction.

At this time, the engagement wrap portion 35 of the engagement portion 33 is located outward of the engagement projection 7, and the second engagement surface 72 that is the lower end of the engagement projection 7 is covered by the wrap surface 38 of the engagement wrap portion 35 from the outer side.

Moreover, at this time, the end portion of the engagement tilted surface 70 on the outer lower side contacts with the guide surface 37. The wrap surface 38 and the engagement erected surface 73 are separate from each other, and are not in surface-contact with each other. Therefore, the combining operation after the positioning is facilitated.

The tip portion 21 of the first duct portion 2 is covered by the outer wall portion 65 of the second divisional body 5 from the outer side. Furthermore, the tip portion 21 is inserted into the rail groove 51 of the second divisional body 5, and is covered by the upper end of the second duct portion 6 from the inner side.

Thus, in the duct device of example 1, a part of the first divisional body 1 and a part of the second divisional body 5 cover each other or are covered by each other in the inner-outer direction and overlap each other in a multilayered state at the time of positioning. Therefore, the first divisional body 1 and the second divisional body 5 are stably positioned relative to each other in the inner-outer direction.

As shown in FIG. 3, the engagement portion 33 of the first divisional body 1 and the engagement projection 7 of the second divisional body 5 merely contact with each other and do not engage with each other at the time of positioning.

In the duct device of example 1, when the first divisional body 1 and the second divisional body 5 that have been positioned relative to each other are combined with each other, a not-illustrated tool is applied onto the upper surface 31$u$ of the leg proximal portion 31, to press the first divisional body downward. The upper surface 31$u$ of the leg proximal portion 31 has a flat-surface shape that is orthogonal to the up-down direction, so that the upper surface 31$u$ easily receives a force from the tool. Therefore, the first divisional body 1 is efficiently combined with the second divisional body 5.

The upper surface 31u of the leg proximal portion 31 is particularly preferably a flat surface that is orthogonal to the up-down direction as in example 1. However, when the upper surface 31u is a flat surface and an angle at which the upper surface 31u intersects the up-down direction is 80° to 100°, the upper surface 31u sufficiently functions as a surface onto which the tool is to be applied.

When a downward force acts on the first divisional body 1 via a not-illustrated tool, the guide surface 37 of the engagement portion 33 of the first divisional body 1 slides downward and outward on the engagement tilted surface 70 of the engagement projection 7 of the second divisional body 5, and the leg body portion 32 of the leg portion 30 is elastically deformed so as to open relative to the first duct portion 2. Thus, the engagement guide portion 34 of the engagement portion 33 is moved over and beyond the engagement projection 7 to combine the first divisional body 1 and the second divisional body 5 with each other as shown in FIG. 4 and FIG. 5.

At the time of combination of the first divisional body 1 and the second divisional body 5 with each other, the engagement portion 33 and the engagement projection 7 engage with each other. More specifically, as shown in FIG. 5, the second engagement surface 72 of the engagement projection 7 contacts with the end portion of the first engagement surface 36 of the engagement portion 33 from the upper side. Therefore, upward movement of the engagement portion 33 is regulated, downward movement of the engagement projection 7 is regulated, and the first divisional body 1 and the second divisional body 5 do not move so as to become separated from each other. Thus, the first divisional body 1 and the second divisional body 5 are combined with each other.

The second engagement surface 72 is tilted below the engagement end 71. Therefore, for example, even if the sizes of the first divisional body 1 and the second divisional body 5 vary at a time of molding and the relative positions of the second engagement surface 72 and the first engagement surface 36 deviate, the first engagement surface 36 is guided by the second engagement surface 72 that is tilted, whereby the relative positions of the second engagement surface 72 and the first engagement surface 36 are corrected, and the relative positions of the engagement portion 33 and the engagement projection 7 are eventually corrected. Therefore, even if the size slightly varies, the first divisional body 1 and the second divisional body 5 are stably combined with each other.

Furthermore, at this time, the inner tilted surface 22 and the outer tilted surface 23 of the seal portion 20 contact with the upper end portion of the second duct portion 6 and the wall body portion 67 of the outer wall portion 65, respectively. Thus, an air flow path 90 is hermetically defined in the duct body 9 shown in FIG. 1. This is because, as described above, the width L1 of the tip portion 21 is less than the width X of the rail groove 51, and the width L2 between the tilted surfaces in a part of the seal portion 20 is greater than the width X of the rail groove 51.

At the time of combination shown in FIG. 4 and FIG. 5, since the seal portion 20 is positioned inward of the outer wall portion 65, the outer wall portion 65 is inhibited from being deformed inward. Therefore, the engagement portion 33 is unlikely to be disengaged from the engagement projection 7.

At the time of combination shown in FIG. 4, if the engagement portion 33 is opened outward, the engagement portion 33 and the engagement projection 7 are disengaged from each other, and the first divisional body 1 and the second divisional body 5 are disassembled from each other. However, in the duct device of example 1, at the time of combination, the engagement portion 33 is covered by the regulation body portions 57 of the regulation portions 55 from the lower side. Therefore, for example, an operator who performs the combining operation is unlikely to touch the lower end of the engagement portion 33, and the engagement portion 33 is inhibited from being unintentionally opened outward, and the engagement portion 33 and the engagement projection 7 are inhibited from being unintentionally disengaged from each other.

The duct device of example 1 does not have a straight-tube-like shape but has a curved shape, which is not shown. Therefore, in the duct device of example 1, a plurality of pairs each including the engagement portion 33 and the engagement projection 7 are disposed along the curved shape of the duct device. Accordingly, directions in which the engagement portion 33 and the engagement projection 7 that are paired are engaged with each other, are not uniform. That is, when the duct device is positioned, the plurality of pairs each including the engagement portion 33 and the engagement projection 7 regulate movement of the first divisional body 1 and the second divisional body 5 relative to each other in the axial direction in the duct device. Therefore, the movement in the axial direction described above does not occur at the time of positioning even if a stopper or the like for regulating movement in the axial direction is not separately provided.

Example 2

A duct device of example 2 is almost the same as the duct device of example 1 except that, in the duct device of example 2, the second divisional body 5 does not have the rail portion 50 and the first duct portion 2 does not have the inner tilted surface 22.

Figure 6:
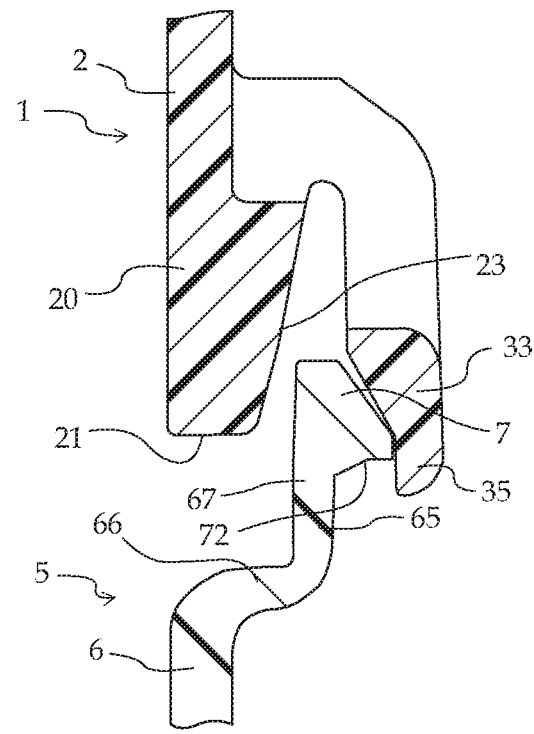
FIG. 6 is a cross-sectional view schematically illustrating a state where a duct device of example 2 is cut at positions similar to the positions A-A in FIG. 2.
Figure 7:
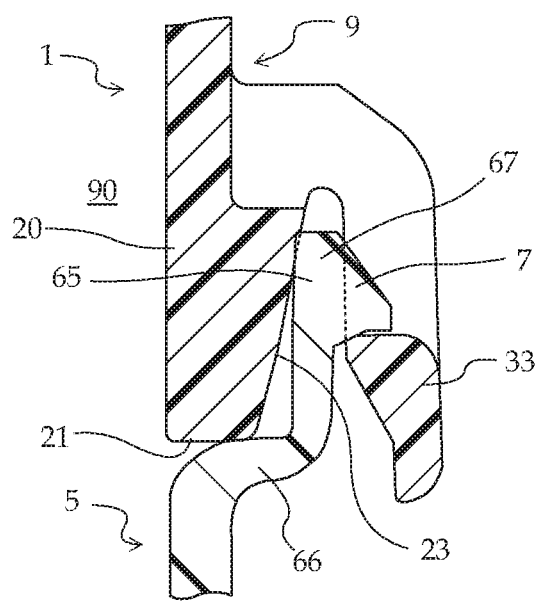
FIG. 7 is a cross-sectional view schematically illustrating a state where the duct device of example 2 is cut at positions similar to the positions A-A in FIG. 4.

FIG. 6 and FIG. 7 are each a cross-sectional view schematically illustrating a state where the duct device of example 2 is cut at positions similar to the positions A-A in FIG. 2. FIG. 6 illustrates the duct device of example 2 at a time of positioning. FIG. 7 illustrates the duct device of example 2 at a time of combination.

As shown in FIG. 6, an outer wall portion 65 of the duct device of example 2 is integrated with the upper end of the second duct portion 6. That is, a wall proximal portion 66 of the outer wall portion 65 extends outward from the upper end of the second duct portion 6. A wall body portion 67 extends upward of the wall proximal portion 66 above the second duct portion 6.

The seal portion 20 of the first duct portion 2 is shaped so as to have a pointed end and has the outer tilted surface 23. The inner side surface of the seal portion 20 linearly extends in the up-down direction.

Also in the duct device of example 2 having such a configuration, as shown in FIG. 6, when the first duct portion 2 and the second duct portion 6 are positioned so as to oppose each other, the engagement portion 33 of the first divisional body 1 and the engagement projection 7 of the second divisional body 5 contact with each other in the up-down direction. Therefore, as in the duct device of example 1, the first divisional body 1 and the second divisional body 5 are stably positioned relative to each other in the up-down direction.

At this time, the engagement wrap portion 35 of the engagement portion 33 is located outward of the engagement projection 7, and the second engagement surface 72 of the engagement projection 7 is covered by the engagement wrap portion 35 from the outer side.

The tip portion 21 of the first duct portion 2 is covered by the outer wall portion 65 of the second divisional body 5 from the outer side.

Therefore, also in the duct device of example 2, as in the duct device of example 1, a part of the first divisional body 1 and a part of the second divisional body 5 cover each other or are covered by each other in the inner-outer direction, and overlap each other in a multilayered state at the time of positioning. Therefore, also in the duct device of example 2, the first divisional body 1 and the second divisional body 5 are stably positioned relative to each other in the inner-outer direction.

In the duct device of example 2, when the first divisional body 1 and the second divisional body 5 that have been positioned relative to each other are combined with each other, the first divisional body 1 is further moved toward the second divisional body 5 so as to engage the engagement portion 33 and the engagement projection 7 with each other, as shown in FIG. 7, as in example 1. Also in the duct device of example 2, the engagement portion 33 and the engagement projection 7 are engaged with each other, whereby the first divisional body 1 and the second divisional body 5 do not move so as to become separated from each other, and the first divisional body 1 and the second divisional body 5 are combined with each other.

At this time, the outer tilted surface 23 of the seal portion 20 contacts with the wall body portion 67 of the outer wall portion 65, and the tip portion 21 of the seal portion 20 contacts with the wall proximal portion 66 of the outer wall portion 65. Therefore, also in the duct device of example 2, the air flow path 90 is hermetically defined in the duct body 9.

Example 3

A duct device of example 3 is almost the same as the duct device of example 1 except for a shape of the engagement portion.

Figure 8:
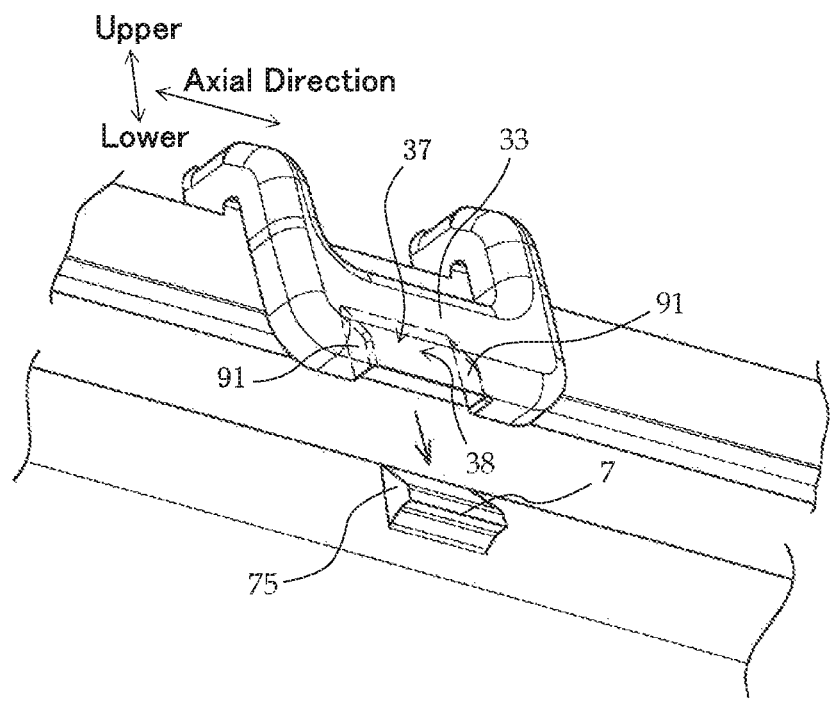
FIG. 8 is a perspective view schematically illustrating a main portion of a duct device of example 3 before positioning.
Figure 9:
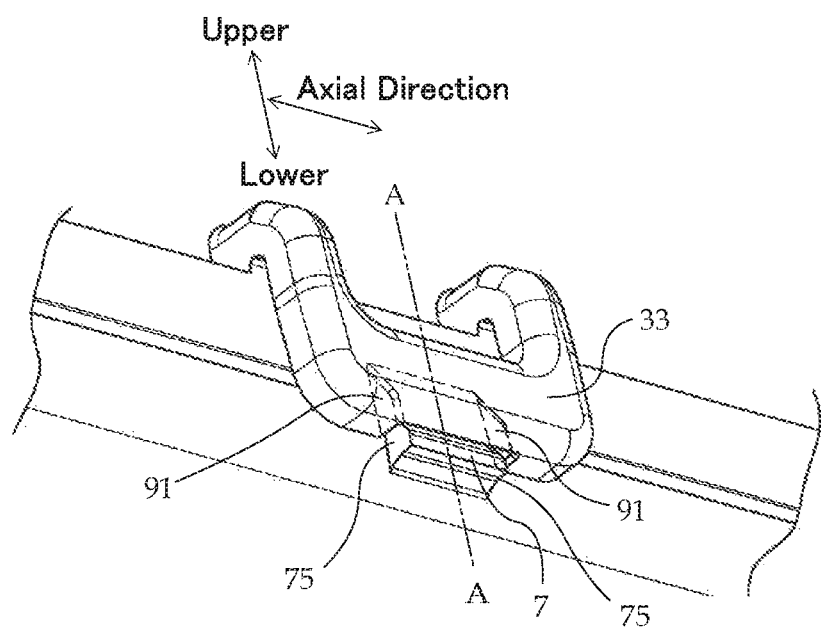
FIG. 9 is a perspective view schematically illustrating the main portion of the duct device of example 3 at a time of positioning.
Figure 10:
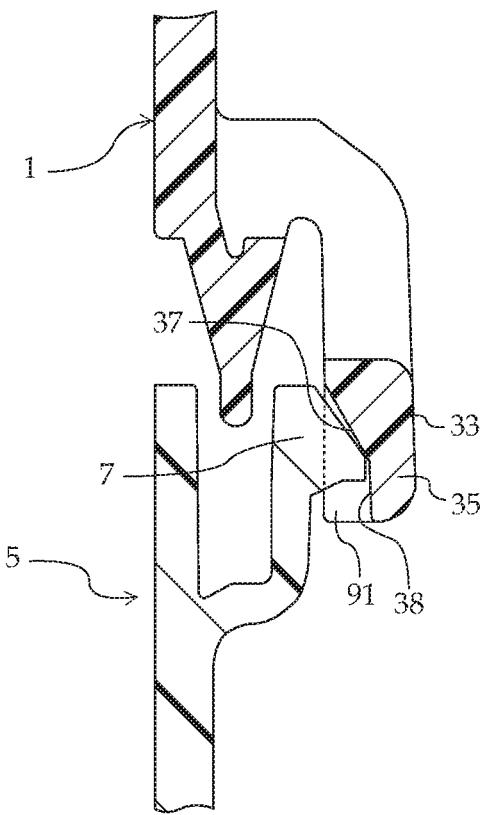
FIG. 10 is a cross-sectional view schematically illustrating a state where the duct device of example 3 is cut at positions A-A in FIG. 9.
Figure 11:
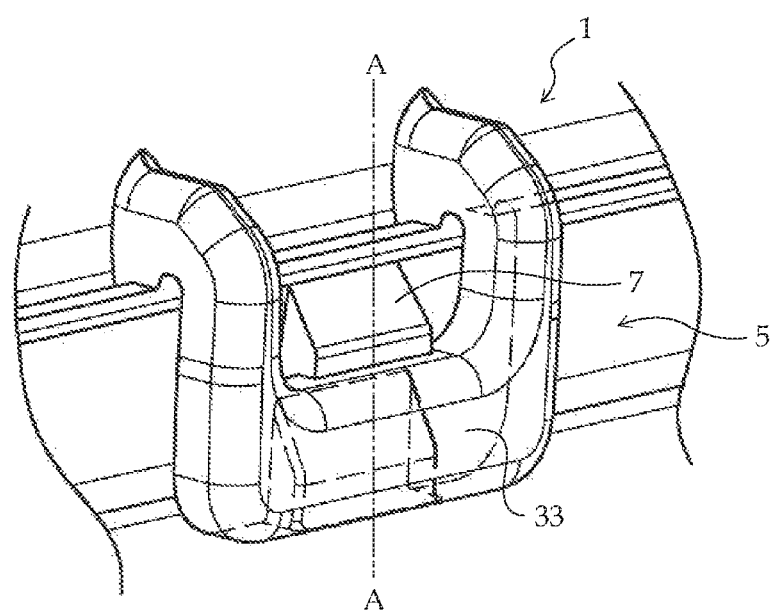
FIG. 11 is a perspective view schematically illustrating the main portion of the duct device of example 3 at a time of combination.
Figure 12:
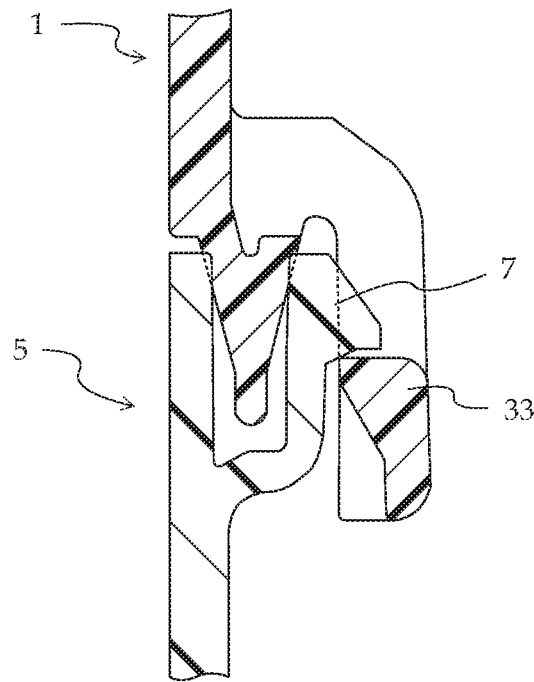
FIG. 12 is a cross-sectional view schematically illustrating a state where the duct device of example 3 is cut at positions A-A in FIG. 11.

FIG. 8 is a perspective view schematically illustrating a main portion of the duct device of example 3 before positioning. FIG. 9 is a perspective view schematically illustrating the main portion of the duct device of example 3 at a time of positioning. FIG. 10 is a cross-sectional view schematically illustrating a state where the duct device of example 3 is cut at positions A-A in FIG. 9. FIG. 11 is a perspective view schematically illustrating the main portion of the duct device of example 3 at a time of combination. FIG. 12 is a cross-sectional view schematically illustrating a state where the duct device of example 3 is cut at positions A-A in FIG. 11.

As shown in FIG. 10, the engagement portion 33 of the duct device of example 3 is the same as the engagement portion 33 of the duct device of example 1 in that the engagement portion 33 has the guide surface 37 and the wrap surface 38. However, the duct device of example 3 is greatly different from the duct device of example 1 in that, as shown in FIG. 8 to FIG. 10, the engagement portion 33 has two regulation surfaces 91 that oppose two axial end surfaces 75 of the engagement projection 7 in the duct device of example 3.

In the duct device of example 3, the guide surface 37 and the wrap surface 38 are disposed between the two regulation surfaces 91 of the engagement portion 33. Therefore, at a time of positioning shown in FIG. 9 and FIG. 10, the regulation surfaces 91 of the engagement portion 33 and the axial end surfaces 75 of the engagement projection 7 oppose each other, to position the engagement portion 33 and the engagement projection 7 relative to each other in the axial direction, and the first divisional body 1 and the second divisional body 5 are eventually positioned relative to each other in the axial direction. At the time of positioning, the first divisional body 1 and the second divisional body 5 are positioned also in the up-down direction and the inner-outer direction, as in the duct device of example 1. Therefore, the duct device of example 3 is advantageous in that, at the time of positioning, the first divisional body 1 and the second divisional body 5 are positioned relative to each other with enhanced stability.

For reference, the engagement portion 33 of the duct device of example 1 has the guide surface 37 and the wrap surface 38 over the entire length in the axial direction. Therefore, the engagement portion 33 of the duct device of example 1 does not have a function of positioning the engagement projection 7 in the axial direction.

Also in the duct device of example 3, when the first divisional body 1 is further moved toward the second divisional body 5 in a state where the first divisional body 1 and the second divisional body 5 have been positioned relative to each other, the engagement portion 33 is moved over and beyond the engagement projection 7, and the engagement portion 33 and the engagement projection 7 engage with each other, to combine the first divisional body 1 and the second divisional body 5 with each other, as shown in FIG. 11 and FIG. 12.

Example 4

A duct device of example 4 is almost the same as the duct device of example 1 except that, in the duct device of example 4, two second ribs having second regulation surfaces are disposed at the outer wall portion.

Figure 13:
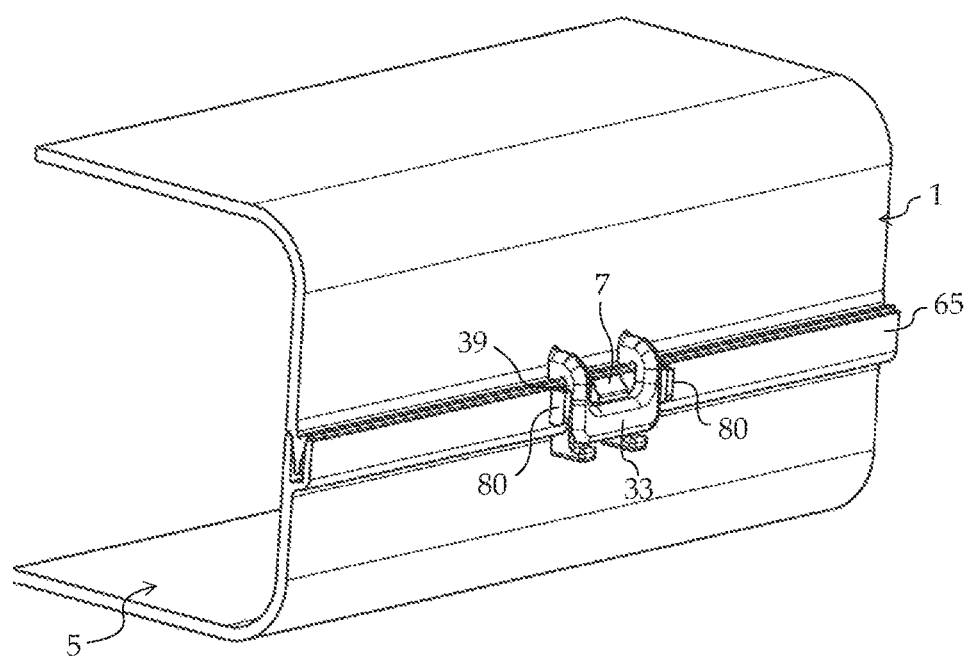
FIG. 13 is a perspective view schematically illustrating a main portion of a duct device of example 4.
Figure 14:
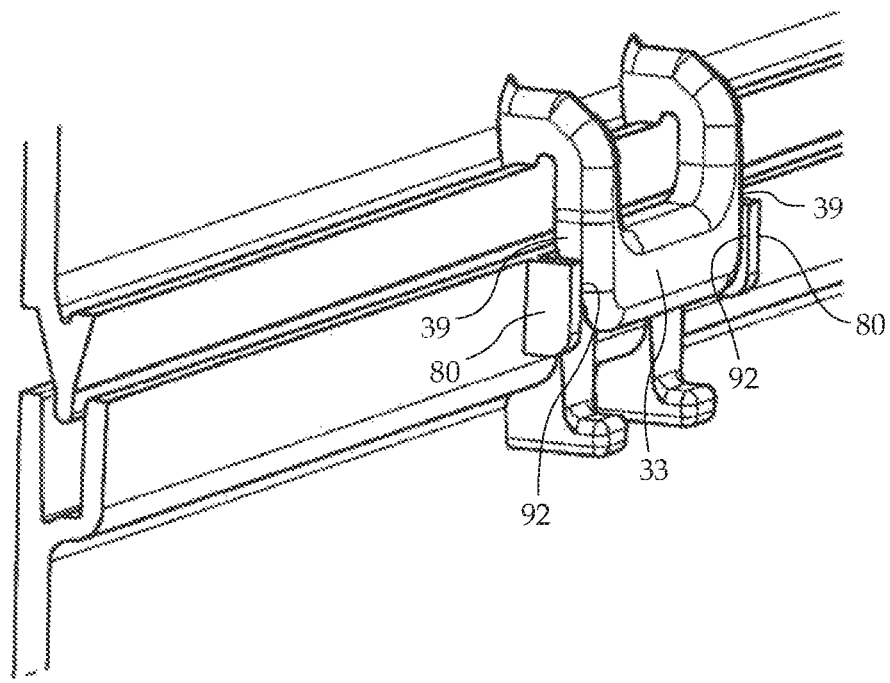
FIG. 14 is a perspective view schematically illustrating the main portion of the duct device of example 4 at a time of positioning.

FIG. 13 is a perspective view schematically illustrating a main portion of the duct device of example 4. FIG. 14 is a perspective view schematically illustrating the main portion of the duct device of example 4 at a time of positioning.

As shown in FIG. 13 and FIG. 14, the second divisional body 5 of the duct device of example 4 has two second ribs 80. The two second ribs 80 project outward from the outer wall portion 65, and extend in the up-down direction. The two second ribs 80 are spaced from each other in the axial direction. As shown in FIG. 13, the engagement projection 7 is disposed between the two second ribs 80. The second ribs 80 have second regulation surfaces 92 that oppose axial end surfaces 39, respectively, of the engagement portion 33 at a time of positioning.

As shown in FIG. 14, the second regulation surface 92 of the second rib 80 opposes the axial end surface 39 of the engagement portion 33 at a time of positioning, and the two second ribs 80 and the engagement portion 33 are positioned relative to each other in the axial direction. Therefore, the engagement projection 7 disposed between the two second ribs 80 and the engagement portion 33 are positioned relative to each other in the axial direction.

Accordingly, also in the duct device of example 4, the first divisional body 1 and the second divisional body 5 are positioned relative to each other in the axial direction at the time of positioning. As in example 1, at the time of positioning, the first divisional body 1 and the second divisional body 5 are positioned relative to each other also in the up-down direction and the inner-outer direction. Therefore, the duct device of example 4 is advantageous in that the first divisional body 1 and the second divisional body 5 are positioned relative to each other with enhanced stability at a time of positioning.

Example 5

A duct device of example 5 is almost the same as the duct device of example 4 except that, in the duct device of example 5, two second ribs are extended from the outer wall portion to the second duct portion, and, further, the first duct portion has a first rib.

Figure 15:
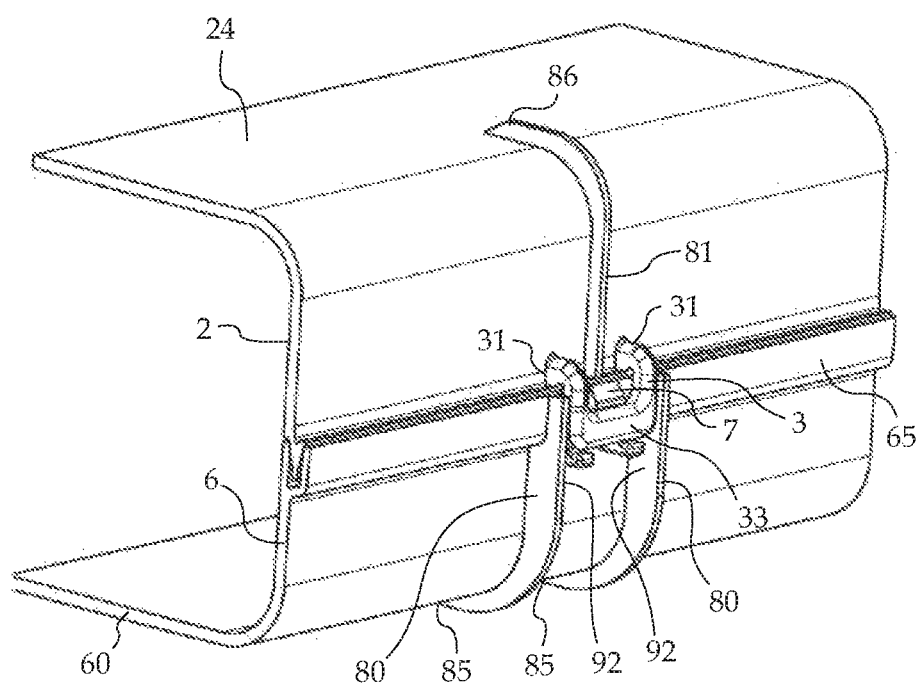
FIG. 15 is a perspective view schematically illustrating a main portion of a duct device of example 5.

FIG. 15 is a perspective view schematically illustrating a main portion of the duct device of example 5.

As shown in FIG. 15, second ribs 80 of the duct device of example 5 project outward, similarly to the second ribs 80 of the duct device of example 4. However, each second rib 80 of the duct device of example 5 is continuously disposed on the outer side surface of the second duct portion 6 as well as the outer wall portion 65. A lower end 85 of the second rib 80 reaches a lower wall 60 of the second duct portion 6. The projection height of the second rib 80 in the inner-outer direction is almost constant.

The first duct portion 2 has a first rib 81. The first rib 81 is disposed on the outer side surface of the first duct portion 2, and projects outward. The first rib 81 continuously extends upward from between the two leg proximal portions 31 of the engagement piece 3. An upper end 86 of the first rib 81 reaches an upper wall 24 of the first duct portion 2. The projection height of the first rib 81 in the inner-outer direction is almost constant.

The two second ribs 80 of the duct device of example 5 have second regulation surfaces 92, similarly to the two second ribs 80 of the duct device of example 4. Therefore, also in the duct device of example 5, at a time of positioning, the second ribs 80 and the engagement portion 33 are positioned relative to each other in the axial direction, and the engagement projection 7 and the engagement portion 33 are positioned relative to each other in the axial direction. Therefore, also in the duct device of example 5, at a time of positioning, the first divisional body 1 and the second divisional body 5 are positioned relative to each other also in the axial direction as well as the up-down direction and the inner-outer direction.

In the duct device of example 5, the second divisional body 5 is reinforced in the up-down direction by the second ribs 80 that extend in the up-down direction, and the first divisional body 1 is reinforced in the up-down direction by the first rib 81 that extends in the up-down direction.

The first rib 81 has a function of reinforcing the second duct portion 6 in the inner-outer direction by reinforcing the second duct portion 6 from the outer side. Similarly, the second ribs 80 have a function of reinforcing the first duct portion 2 in the inner-outer direction by reinforcing the first duct portion 2 from the outer side.

Therefore, the duct device of example 5 is advantageous in that, at a time of combination, even when the first divisional body 1 and the second divisional body 5 are strongly pressed in the up-down direction, the first divisional body 1 and the second divisional body 5 are inhibited from being deformed, and the first divisional body 1 and the second divisional body 5 are stably combined with each other.

Example 6

A duct device of example 6 is almost the same as the duct device of example 5 except for a shape of the lower end of the second rib and a shape of the upper end of the first rib.

Figure 16:
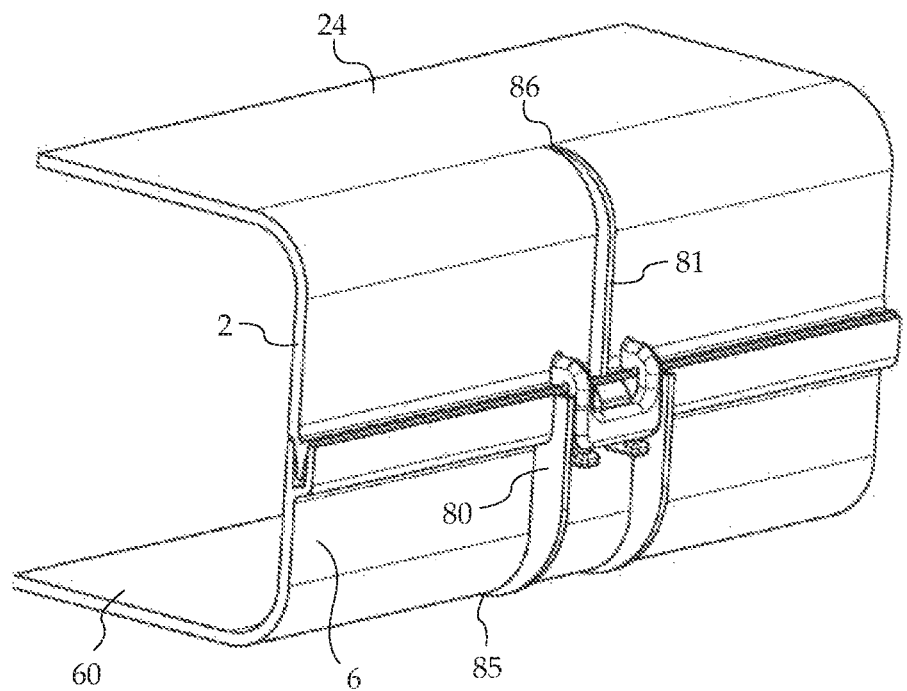
FIG. 16 is a perspective view schematically illustrating a main portion of a duct device of example 6.

FIG. 16 is a perspective view schematically illustrating a main portion of the duct device of example 6.

As shown in FIG. 16, in the duct device of example 6, a first rib 81 has a tapered shape in which the projection height of the first rib 81 is gradually reduced toward an upper end 86. The upper end 86 of the first rib 81 does not reach the upper wall 24 of the first duct portion 2. In the duct device of example 6, second ribs 80 each have a tapered shape in which the projection height of the second rib 80 is gradually reduced toward a lower end 85. The lower end 85 of the second rib 80 does not reach the lower wall 60 of the second duct portion 6.

Therefore, in the duct device of example 6, while the second ribs 80 reinforce the second divisional body 5 in the up-down direction and the inner-outer direction, and the first rib 81 reinforces the first divisional body 1 in the up-down direction as in the duct device of example 5, the duct device of example 6 has the size reduced in the up-down direction since the first rib 81 and the second ribs 80 are tapered. The duct device of example 6 allows space saving, and is appropriate as an on-vehicle duct device which is disposed in a limited space.

Example 7

A duct device of example 7 is almost the same as the duct device of example 1 except that the duct device of example 7 has a guide portion.

Figure 17:
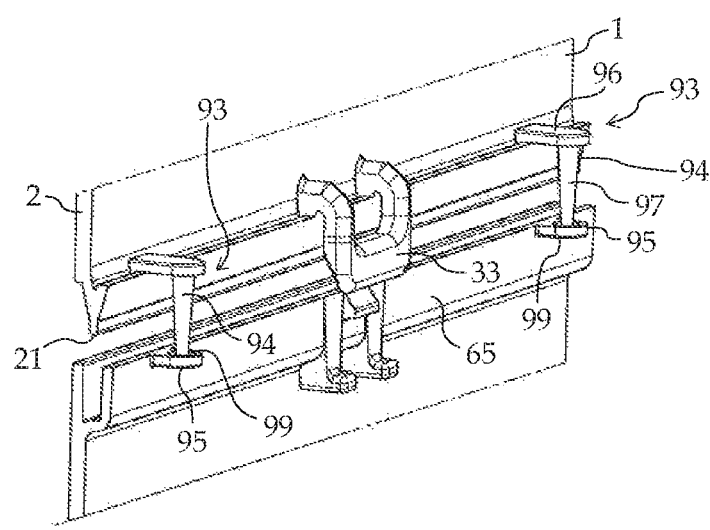
FIG. 17 is a perspective view schematically illustrating a main portion of a duct device of example 7 before positioning.
Figure 18:
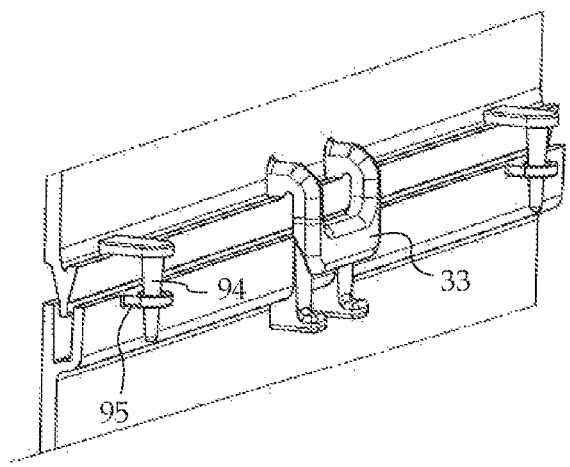
FIG. 18 is a perspective view schematically illustrating the main portion of the duct device of example 7 at a time of positioning.
Figure 19:
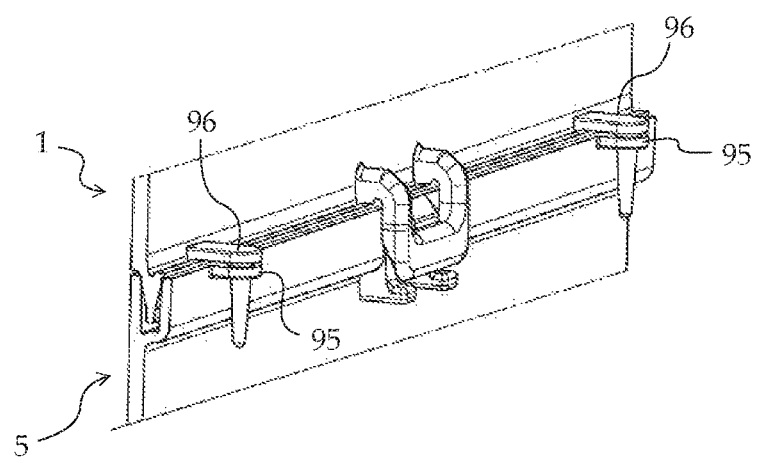
FIG. 19 is a perspective view schematically illustrating the main portion of the duct device of example 7 at a time of combination.

FIG. 17 is a perspective view schematically illustrating a main portion of the duct device of example 7 before positioning. FIG. 18 is a perspective view schematically illustrating the main portion of the duct device of example 7 at a time of positioning. FIG. 19 is a perspective view schematically illustrating the main portion of the duct device of example 7 at a time of combination.

As shown in FIG. 17, the duct device of example 7 has two guide portions 93. Each guide portion 93 has a guide projection 94 that extends in the up-down direction on the outer side of the first duct portion 2, and a guide frame 95 through which the guide projection 94 is inserted. The guide projection 94 has a guide proximal portion 96 that is integrated with the first duct portion 2 of the first divisional body 1 and projects outward, and a projection 97 that extends downward from the guide proximal portion 96 on the outer side of the first duct portion 2. The projection 97 has an almost conical shape, and has the lower end located below the tip portion 21 and the lower end of the engagement portion 33. The two guide projections 94 are spaced from each other in the axial direction, and the engagement portion 33 is disposed between the two guide projections 94.

The two guide frames 95 are disposed at the outer wall portion 65 of the second divisional body 5, and project outward of the outer side of the outer wall portion 65. The two guide frames 95 each have a guide hole 99 that penetrates in the up-down direction. The two guide frames 95 are disposed at positions corresponding to the two guide projections 94, respectively.

As described above, the lower end of the projection 97 is located below the tip portion 21 and below the lower end of the engagement portion 33. Therefore, as shown in FIG. 17, the lower end of the projection 97 is inserted into the guide hole 99 of the guide frame 95 before positioning. Accordingly, positioning of the first divisional body 1 and the second divisional body 5 as shown in FIG. 18 is performed in a state where the first divisional body 1 and the second divisional body 5 have already been positioned relative to each other in the axial direction and the inner-outer direction by the guide frames 95 and the guide projections 94. Therefore, for the duct device of example 7, positioning in the axial direction and the inner-outer direction is performed with enhanced precision and stability.

The guide hole 99 is a round through hole. The projection 97 has an almost conical shape. Therefore, even if the guide hole 99 and the projection 97 slightly deviate from each other before positioning, the guide hole 99 and the projection 97 are positioned relative to each other while being adjusted so as to be at correct positions. This also facilitates positioning in the duct device of example 7.

At the time of combination shown in FIG. 19, the guide frame 95 and the guide proximal portion 96 contact with each other, and, therefore, the first divisional body 1 and the second divisional body 5 no longer move so as to approach each other. Therefore, the guide portion 93 also functions as a stopper at a time of combination. In the duct device of example 7, the number of the guide portions 93 disposed and the number of the guide frames 95 disposed are equal to each other. The numbers may be appropriately selected according to, for example, the shape and the size of the duct device as appropriate.

Example 8

A duct device of example 8 is almost the same as the duct device of example 7 except that the duct device of example 8 has a first rib integrated with a guide portion, and a third rib.

Figure 20:
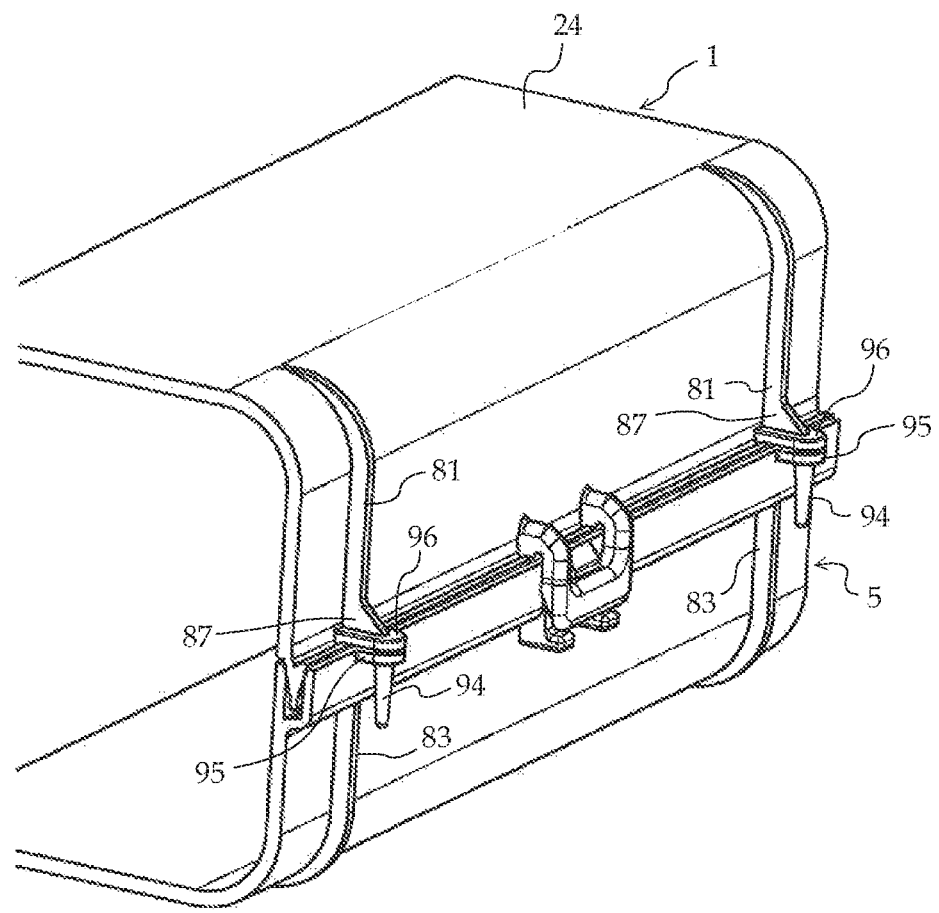
FIG. 20 is a perspective view schematically illustrating a main portion of a duct device of example 8.

FIG. 20 is a perspective view schematically illustrating a main portion of the duct device of example 8.

As shown in FIG. 20, in the duct device of example 8, first ribs 81 are integrated with the guide projections 94. More specifically, a lower end portion 87 of each first rib 81 is integrated with the guide proximal portion 96 of the guide projection 94. The projection height of the first rib 81 in the outward direction is gradually increased in the lower end portion 87. The lower end portion 87 has an almost triangular shape. Except for the above-described points, the first rib 81 of the duct device of example 8 is almost the same as the first rib 81 of the duct device of example 6.

The second duct portion 6 has third ribs 83. Each third rib 83 is disposed on the outer side surface of the second duct portion 6 below the outer wall portion 65, projects outward, and extends in the up-down direction. The third rib 83 is disposed below the guide frame 95. The third rib 83 reinforces the second divisional body 5 in the up-down direction and the inner-outer direction.

In the duct device of example 8, the first rib 81 is integrated with the guide projection 94. The first rib 81 extends in the up-down direction, similarly to the first rib 81 of the duct device of example 6. Although an upper end 86 of the first rib 81 does not reach the upper wall 24 of the first duct portion 2, the upper end 86 extends to a portion near the upper wall 24. Therefore, the first rib 81 reinforces the first divisional body 1 in the up-down direction. Furthermore, the first rib 81 is integrated with the guide projection 94, and thus also reinforces the guide projection 94.

The projection height of the first rib 81 in the outward direction in the lower end portion is greater than the projection heights of other portions, and the first rib 81 reinforces the guide projection 94 in the inner-outer direction. Therefore, the guide projection 94 reinforced by the first rib 81 is unlikely to be deformed in the inner-outer direction, and the guide portion 93 that includes the guide projection 94 and the guide frame 95 allows the first divisional body 1 and the second divisional body 5 to be precisely and stably positioned, in particular, in the inner-outer direction.

Example 9

A duct device of example 9 is almost the same as the duct device of example 8 except that the duct device of example 9 does not have a second rib and merely has a short first rib.

Figure 21:
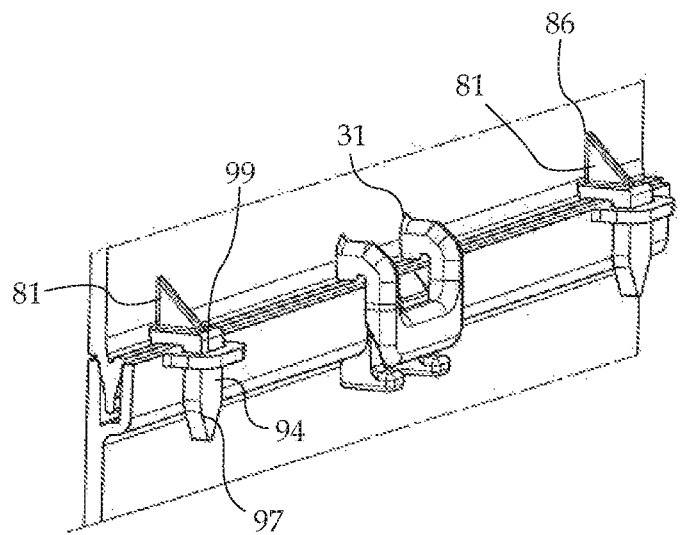
FIG. 21 is a perspective view schematically illustrating a main portion of a duct device of example 9.

FIG. 21 is a perspective view schematically illustrating a main portion of the duct device of example 9.

As shown in FIG. 21, in the duct device of example 9, first ribs 81 are integrated with guide projections 94.

In the duct device of example 9, a projection 97 of each guide projection 94 does not have an almost conical shape but has an almost plate-like shape. A guide hole 99 of a guide frame 95 is a quadrangular through hole corresponding to the projection 97.

Unlike the first rib 81 of the duct device of example 8, the first rib 81 of the duct device of example 9 has little function of reinforcing the first divisional body 1 in the up-down direction. However, the first rib 81 of the duct device of example 9 reinforces the guide projection 94 in the inner-outer direction, similarly to the first rib 81 of the duct device of example 8. Therefore, also in the duct device of example 9, the guide projection 94 reinforced by the first rib 81 is unlikely to be deformed in the inner-outer direction, and the guide portions 93 allow the first divisional body 1 and the second divisional body 5 to be precisely and stably positioned, in particular, in the inner-outer direction.

In the duct device of example 9, the projection 97 has an almost plate-like shape, and the guide hole 99 is a quadrangular through hole. The guide hole 99 and the projection 97 have a function of positioning the first divisional body 1 and the second divisional body 5 in the axial direction and the inner-outer direction before positioning. Therefore, also in the duct device of example 9, the first divisional body 1 and the second divisional body 5 are stably positioned relative to each other.

The present invention is not limited to the embodiments described above and shown in the drawings, and is implemented by being appropriately modified without departing from the gist of the invention. Furthermore, components in the embodiments and the like described above may be freely extracted and combined to be implemented.

The invention claimed is:

1. A duct device comprising:
   a duct body in which an air flow path is defined, and a first divisional body and a second divisional body are combined in a combining direction in which the first divisional body and the second divisional body approach each other, wherein
   the first divisional body includes a first duct portion that is a part of the duct body, and an engagement piece having a leg portion and an engagement portion, the leg portion being integrated with the first duct portion and extending in the combining direction on an outer side of the first duct portion, the engagement portion being disposed at a front end of the leg portion,
   the second divisional body includes a second duct portion that is another part of the duct body, an outer wall portion, and an engagement projection, the outer wall portion being integrated with the second duct portion and extending in the combining direction on an outer side of the second duct portion, the engagement projection projecting outward from the outer wall portion and engaging with the engagement portion at a time of combination of the first divisional body and the second divisional body with each other, and when the first duct portion and the second duct portion oppose each other at a time of positioning, and the engagement portion and the engagement projection do not engage with each other, the engagement portion and the engagement projection contact with each other in the combining direction, the outer wall portion covers, from an outer side, a tip portion that is a front end of the first duct portion, and a distance from the tip portion relative to the second duct portion is smaller than a distance from an end of the outer wall portion on the first duct portion side relative to the second duct portion, and the engagement portion covers an engagement surface that is a rear end of the engagement projection, with an engagement wrap portion, from the outer side.

2. The duct device according to claim 1, wherein
an end portion of the second duct portion and the outer wall portion form a rail portion disposed so as to include a gap in an inner-outer direction, and
a seal portion that is an end portion of the first duct portion has a pointed shape having a tilted surface which is tilted toward the tip portion, and the seal portion is inserted into the gap of the rail portion at the time of positioning.

3. The duct device according to claim 2, wherein
the tilted surface of the seal portion contacts with the end portion of the second duct portion and the outer wall portion at the time of combination.

4. The duct device according to claim 3, wherein
the first divisional body has a first rib that is integrated with the first duct portion, and extends in the combining direction on the outer side of the first duct portion.

5. The duct device according to claim 4, wherein
the second divisional body has two second ribs that are integrated with the outer wall portion, and extend in the combining direction on an outer side of the outer wall portion.

6. The duct device according to claim 5, wherein
the two second ribs are disposed on both sides of the engagement projection, and
the engagement portion is disposed between the two second ribs at the time of combination.

7. The duct device according to claim 6, wherein
a portion of the leg portion on the first duct portion side has a flat surface that intersects the combining direction at 80° to 100°.

8. The duct device according to claim 1, wherein
the first divisional body has a first rib that is integrated with the first duct portion, and extends in the combining direction on the outer side of the first duct portion.

9. The duct device according to claim 8, wherein
the second divisional body has two second ribs that are integrated with the outer wall portion, and extend in the combining direction on an outer side of the outer wall portion.

10. The duct device according to claim 9, wherein
the two second ribs are disposed on both sides of the engagement projection, and
the engagement portion is disposed between the two second ribs at the time of combination.

11. The duct device according to claim 10, wherein
a portion of the leg portion on the first duct portion side has a flat surface that intersects the combining direction at 80° to 100°.

12. The duct device according to claim 1, wherein
the second divisional body has two second ribs that are integrated with the outer wall portion, and extend in the combining direction on an outer side of the outer wall portion.

13. The duct device according to claim 12, wherein
the two second ribs are disposed on both sides of the engagement projection, and
the engagement portion is disposed between the two second ribs at the time of combination.

14. The duct device according to claim 1, wherein
a portion of the leg portion on the first duct portion side has a flat surface that intersects the combining direction at 80° to 100°.

* * * * *